Jan. 23, 1934.    F. W. HENKE, JR    1,944,512
LOCKING MEANS FOR SPARE VEHICLE WHEELS AND THE TIRES THEREOF
Filed Sept. 23, 1931    2 Sheets-Sheet 2
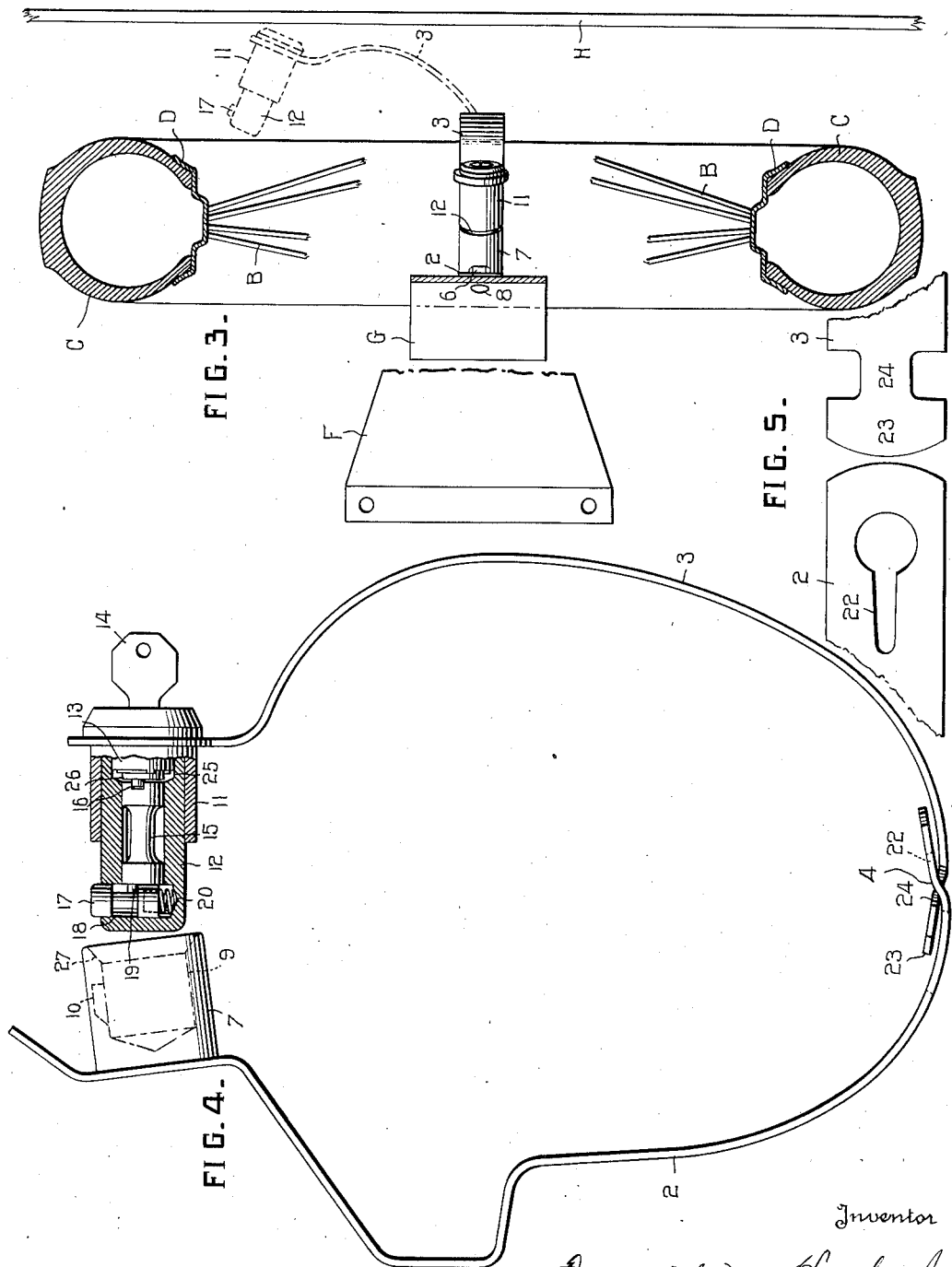

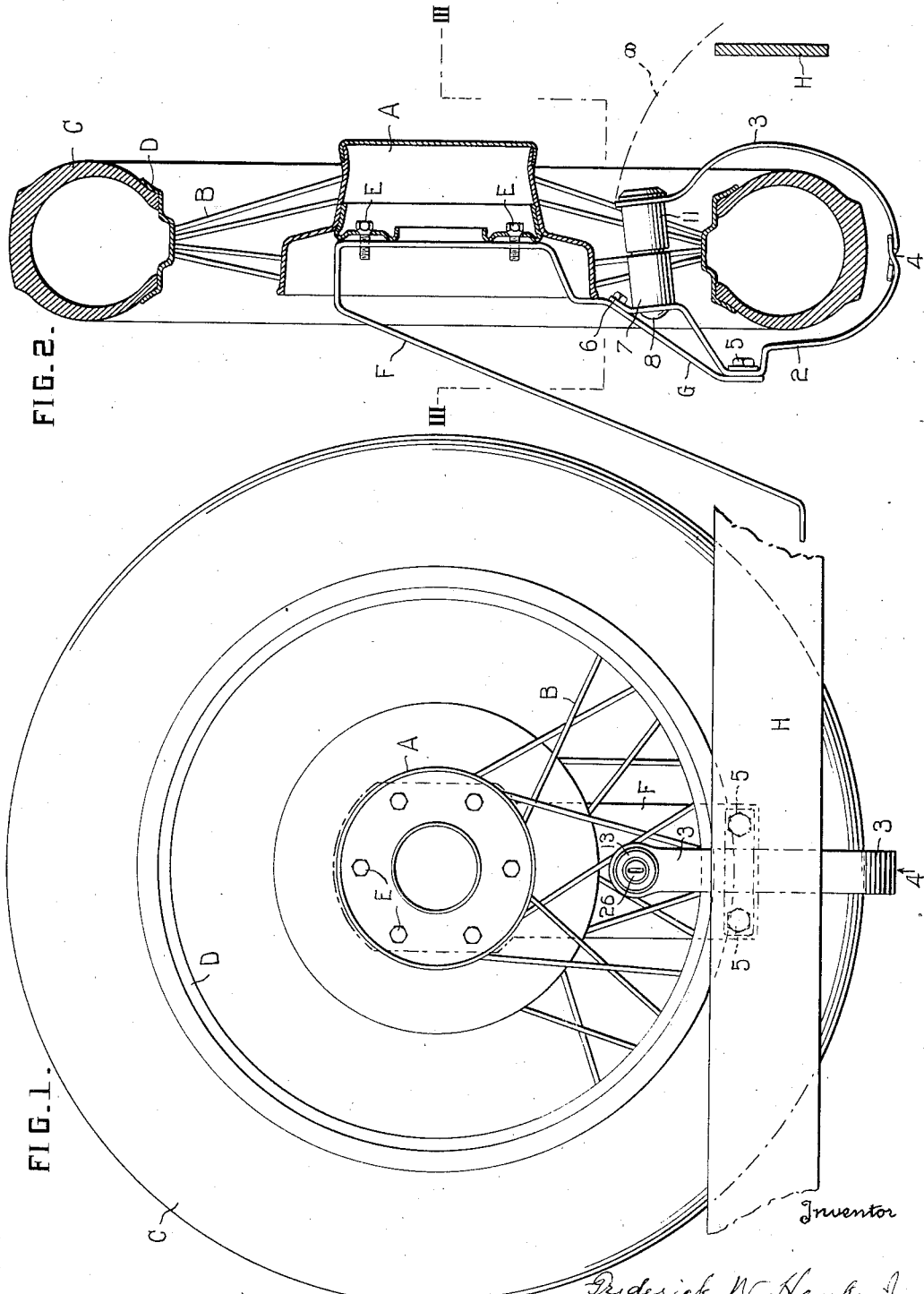

Patented Jan. 23, 1934

1,944,512

UNITED STATES PATENT OFFICE 1,944,512

LOCKING MEANS FOR SPARE VEHICLE WHEELS AND THE TIRES THEREOF

Frederick W. Henke, Jr., Philadelphia, Pa., assignor to Fox Automotive Products Corporation, Philadelphia, Pa., a corporation of Delaware Application September 23, 1931
Serial No. 564,633

4 Claims. (Cl. 70—90)

This invention relates to tire and spare wheel locks of the tire-encircling-band type. It has for its object to provide tire and wheel locks of this kind especially adapted for use in connection with spoked automobile wheels of present day construction while supported as spares on carriers provided therefor at the rear of automobiles; and consists in improvements whereby the locks may be cheaply and easily manufactured and assembled, are simple in construction, easily manipulated, reliable in use, may be securely attached either as standard equipment on the car or applied thereto as an accessory, and which are adapted for manipulation, in the application and removal of the spare wheel to the tire carrier on the car, in the restricted space which is available between the wheel while supported on the carrier and the rear bumper of the automobile.

In the accompanying drawings illustrating the preferred embodiment of the present invention:

Figure 1 is a rear view illustrating a spare wheel mounted at the rear of an automobile with the present invention applied thereto;

Figure 2 is a vertical sectional view of the same;

Figure 3 is a horizontal sectional view taken on the line III—III of Figure 2.

Figure 4 is a side elevation enlarged of the tire and wheel lock detached, portions being in section and Figure 5 is a detail broken view of the hinge-connected ends of the two parts that constitute the encircling band of the lock.

Referring to the drawings A designates the hub of a spare wheel, B the spokes thereof, C the pneumatic tire and D the rim upon which the tire is mounted. These parts are of standard construction, the wheel chosen for illustration being one in common use, for which the present invention is particularly well adapted. Such a wheel is represented as supported upon a wheel carrier F at the rear of an automobile, to which the wheel is secured by means of bolts E that pass through the inner rim or flange of the hub of the wheel, as is usual.

The wheel and tire lock consists of a band adapted to encircle the tire and rim of the wheel when supported as a spare, such band being formed of two parts 2 and 3 united by hinge 4 which is preferably located directly opposite the central tread portion of the tire, as shown in Figure 2. The section 2 of the band is permanently secured to a portion G of the bracket F, the section 3 being free to swing by reason of its hinge connection with the section 2, in order to permit easy application of the wheel to its supporting carrier or its removal therefrom as desired. The ends of these two parts of the band are adapted to be united, forming a lock that completely encircles the tire and its rim, the parts which unite the two band sections passing between the spokes as best represented in Figure 2 and being located between the hub of the wheel and the rim D thereof.

The section 2 of the band is permanently attached to the bracket or support G by a clamp plate and securing bolts as indicated at 5, located between the hinge 4 and the opposite end of the band 2, the latter being also secured to the bracket or support G, by suitable means, such as bolt 6.

The tire and wheel lock thus far described is in many of its features like that illustrated and claimed in my co-pending application Ser. No. 436,577, filed March 17, 1930, which has matured into Patent No. 1,845,916, dated February 16, 1932.

There is secured to the section 2 of the encircling band, near its inner end and preferably adjacent to the place where it is secured, at 6, to its support, a hollow cylindrical member or socket piece 7. This is secured to the band by a rivet 8 or other suitable means, and is of a length to extend a considerable distance across the wheel rim and tire from back toward the front, preferably at least a half of such distance.

To the outer or free end of the other section, 3, of the band is secured a key-operated lock employed to unite together the sections of the band in position encircling the tire and rim.

This lock is preferably constructed as follows: 11 indicates a cylindrical casing extending from the inner face of the band 3 and secured to the free end thereof in any suitable manner. This is located in such position that when the band parts are brought together in wheel-and-tire-locking relationship, as represented in Figures 1 and 2, the ends of the parts 7 and 11 abut, they being preferably both cylindrical in shape and of the same external diameter. Within the cylindrical casing 11 is supported another cylindrical piece 12 which is longer than the casing 11 and is adapted to enter the socket or chamber 9 in the piece 7 when the band parts are closed together. In the outer end of the cylindrical piece 12, that is the end toward the section 3 of the band, there is formed an enlarged cylindrical recess 25 in which is mounted the casing 13 of a lock adapted to be operated by a key 14. The details of this lock constitute no feature of the present invention. Suffice it to say it has a turning barrel 26 that carries at its end an eccentrically disposed pin 16 that is adapted to engage with a coupling piece 15, supported for turning movements in the central cylindrical bore of the piece 12. This coupling piece is provided at its inner end with an eccentric pin 19 that has engagement with and moves a locking bolt 17 supported in a transverse bore 18 formed in the end of the cylindrical piece 12. Behind this locking bolt and tending to move it outwardly is a spring 20.

The hinge 4 that unites the two sections of the band is of a construction that will permit a turning movement of the band 3 in two directions, one directly toward and from the band 2 in planes including the side edges of the two band sections 2 and 3, when these are brought together as represented in Figures 1 and 2, and the other turning movement in a lateral direction, that is one that will take the section 3 out of the common planes including the two band sections.

In order to permit the application of a wheel to the carrying support F, G or its removal therefrom, the ends of the encircling band must first be separated as represented in dotted lines in Figure 3. In the present day equipment of some automobiles the rear bumper H is set so close to the spare wheel that the band section 3 cannot be moved directly away from the section 2 along a path represented by the dot and dash line $a$ of Figure 2, in the common planes of the two sections, sufficiently far to allow the removal of the spare wheel from its support, because of the engagement of the swinging portion of the band lock with the said rear bumper. This difficulty is overcome in the present invention by constructing the hinge 4 so that after the lock is opened to a certain extent the section 3 may be turned to one side, as represented in dotted lines in Figure 3, this turning movement taking place between the spare wheel and the rear bumper H and being sufficient to allow the wheel to be removed or replaced and accomplished without separation of the band sections at the hinge 4.

In order to provide for such compound swinging movements of the outer free band section there is provided in the end of one of the sections, preferably the section 2, a key-hole-shaped aperture 22; while the cooperating end of the other section is fabricated into a T-shaped head 23 united to the main body of the section by a neck 24 of a width approximately the diameter of the cylindrical portion of the key-hole-shaped opening 22. The length of the opening 22 is sufficient to permit the head 23 to be passed through the same. When this has been done and the neck 24 has been brought into the cylindrical part of the key-hole-shaped opening the sections of the band will be securely united and will yet be free to have the compound movements described. The present invention is used as follows: The section 2 of the band is secured to the supporting parts that are carried by the automobile, as by applying the securing means 5 and 6. These specific securing means are preferably employed but they are to be understood as typical and the present invention is not limited to their use either in their specific construction or location. The next operation is to unite the two sections of the band, by passing the head 23 of the section 3 through the key-hole-shaped opening 22, leaving the section 3 turned laterally to one side as indicated in dotted lines in Figure 3. The wheel may then be applied to the carrier F, the band not interfering therewith when in the position last referred to. The wheel, being in place, is locked by turning the band 3 into the common planes of the band 2 and then closing the sections of the band so as to encircle the tire and rim of the wheel. During this closing movement the locking parts that hold together the band sections are caused to telescope. The projecting cylindrical piece 12 enters the socket 9 of the piece 7 carried by the band 2 until the edges of the cylindrical pieces or parts 7 and 12 abut. As the piece 11 enters the socket 9 the projecting end of the locking bolt 17 engages with the beveled inner edge 27 of the socket piece 7 and is forced inwardly compressing the spring 20. At about the time the telescoping movement of the locking parts is completed the end of the spring-actuated bolt 17 comes opposite to a recess 10 opening from the socket 9 into which it is projected by the spring, thus locking the band in a closed position encircling the tire and rim. When it is desired to remove the wheel a proper key 14 is applied to the lock 13 turning the barrel 26 thereof. The eccentric pin of this barrel engages with and turns the coupling piece 15, and the pin 19 carried thereby in turn engages with and moves the bolt 17 against the action of the spring 20, thus unlocking the parts and permitting them to separate.

The band may be closed and locked about the tire and rim without necessitating the use of the key 14 as is apparent.

It will be noted that the inter-engaging members of the lock parts which unite the upper ends of the sections 2 and 3 are located entirely between these ends of the sections. In tire and wheel locks of the general character to which the present invention belongs as heretofore constructed, the locking parts, or some of them, project beyond the outer faces of the parts 2 and 3, usually beyond the outer face of the section 3. This projecting of the lock that unites the separable band sections beyond the outer face or faces of the band has been found to interfere with the separation of the band sections sufficiently to permit the removal of the spare wheel because of engagement with fixed attachments carried by the automobile. By the arrangement herein illustrated and described the band sections can be separated sufficiently far without interfering with fixed parts to allow the movable section 3 to be turned, as has been described, so as to afford sufficient free space for the application or removal of the wheel.

The lock described while of simple construction is very strong and is well protected against attack of thieves or other evil-disposed persons.

What is claimed is:

1. In a lock for a spare wheel and its tire of the band-encircling type, the combination with the band, one end of which is permanently secured to a supporting part, and the other is free to move relative thereto, of bridging pieces between the ends of the bands when brought toward each other to close about the tire and rim, such bridging pieces being carried by the respective end portions of the band and arranged to telescope one within the other, and locking means for uniting the said telescopic bridging parts together.

2. In a lock for a spare wheel and its tire of the band-encircling type, the combination of a band formed of two sections, one permanently secured to a support and the other hinged thereto and movable toward and away from the other section to permit the application or removal of a spare wheel, a socket piece carried by one of the band sections, a casing carried by the other section, a lock mounted in the said casing and projecting therefrom, the projecting portion of the lock adapted to have telescopic engagement with the socket piece and also to have locking engagement therewith.

3. In a lock for a spare wheel and its tire of the band-encircling type, the combination of a band formed of two sections, one permanently secured to a support and the other hinged thereto and movable toward and away from the other section to permit the application or removal of a spare wheel, a socket piece carried by one of the band sections, a casing carried by the other section, a projecting piece supported in the casing and projecting beyond the end thereof and arranged to enter the socket piece when the parts of the band are brought together into position to encircle a wheel and tire, and a lock mechanism mounted within the said projecting piece including a bolt that engages with the socket piece.

4. In a lock for a spare wheel and its tire of the band-encircling type, the combination of a band formed of two sections, one permanently secured to a support and the other hinged thereto and movable toward and away from the other section to permit the application or removal of a spare wheel, a socket piece carried by one of the band sections, a casing carried by the other section, a hollow piece mounted within the casing and projecting beyond the end thereof, the projecting portion being arranged to have telescopic engagement with the socket piece when the two parts of the band are brought together to encircle a tire, a key-operated lock supported in the outer end of the said projecting piece, a spring-actuated bolt arranged to have locking engagement with the socket piece mounted in the projecting portion of the said hollow piece and a coupling between the lock and the bolt whereby the latter is moved when the lock is operated by the key.

FREDERICK W. HENKE, Jr.